(12) United States Patent
Kobayashi et al.

(10) Patent No.: US 10,010,857 B2
(45) Date of Patent: Jul. 3, 2018

(54) POLYARYLENE SULFIDE PRODUCTION DEVICE PROVIDED WITH SUPPLY TUBE

(71) Applicant: Kureha Corporation, Tokyo (JP)

(72) Inventors: Masanori Kobayashi, Tokyo (JP); Tetsuya Morikawa, Tokyo (JP); Kiyotaka Tadano, Tokyo (JP); Yoshihiro Ichinose, Tokyo (JP); Koichi Suzuki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 53 days.

(21) Appl. No.: 15/512,983

(22) PCT Filed: Sep. 18, 2015

(86) PCT No.: PCT/JP2015/076779
§ 371 (c)(1),
(2) Date: Mar. 21, 2017

(87) PCT Pub. No.: WO2016/047632
PCT Pub. Date: Mar. 31, 2016

(65) Prior Publication Data
US 2017/0282150 A1    Oct. 5, 2017

(30) Foreign Application Priority Data
Sep. 22, 2014  (JP) .................. 2014-192649

(51) Int. Cl.
*C08G 75/14* (2006.01)
*B01J 19/24* (2006.01)
(Continued)

(52) U.S. Cl.
CPC ...... *B01J 19/2415* (2013.01); *C08G 75/0209* (2013.01); *C08G 75/0263* (2013.01); *C08G 75/0281* (2013.01); *C08G 75/14* (2013.01)

(58) Field of Classification Search
CPC ... B01J 19/2415; B01J 19/24; C08G 75/0209; C08G 75/0263; C08G 75/0281; C08G 75/14
(Continued)

(56) References Cited

U.S. PATENT DOCUMENTS

| | | | |
|---|---|---|---|
| 4,645,826 A | 2/1987 | Iizuka et al. | |
| 4,745,167 A * | 5/1988 | Iizuka | C08G 75/0254 526/262 |

(Continued)

FOREIGN PATENT DOCUMENTS

| | | |
|---|---|---|
| JP | S453368 B1 | 2/1970 |
| JP | S617332 A | 1/1986 |

(Continued)

OTHER PUBLICATIONS

International Search Report for PCT/JP2015/076779 dated Nov. 17, 2015.
(Continued)

*Primary Examiner* — Huy-Tram Nguyen
(74) *Attorney, Agent, or Firm* — Birch, Stewart, Kolasch & Birch, LLP

(57) ABSTRACT

The present invention provides an a polyarylene sulfide (PAS) production device provided with a supply tube for loading corrosive materials such as a strong alkali into a reaction vessel, wherein prescribed amounts of various raw materials or the like can be accurately loaded into the reaction vessel without causing decreases in production efficiency due to the replacement of the supply tube or the repair of the reaction vessel in response to the corrosion of the supply tube or the like.

The present invention is a production device, and a PAS production device, in particular, provided with a reaction vessel equipped with one or a plurality of supply tubes, at
(Continued)

least one of the supply tubes having an insert pipe, which is preferably detachable, to be inserted into an outer supply tube; and a tip opening of the insert pipe being positioned further inward than an inside wall of the reaction vessel.

9 Claims, 2 Drawing Sheets

(51) Int. Cl.
*C08G 75/0209* (2016.01)
*C08G 75/0263* (2016.01)
*C08G 75/0281* (2016.01)

(58) Field of Classification Search
USPC .......................................................... 422/131
See application file for complete search history.

(56) References Cited

U.S. PATENT DOCUMENTS

| | | |
|---|---|---|
| 4,767,841 A | 8/1988 | Goetz et al. |
| 4,841,019 A | 6/1989 | Iwasaki et al. |
| 4,931,516 A | 6/1990 | Iizuka et al. |
| 5,342,920 A | 8/1994 | Imai et al. |
| 2004/0010098 A1* | 1/2004 | Groos .................. B01F 5/0473 526/64 |
| 2008/0097075 A1 | 4/2008 | Matsuzaki et al. |
| 2010/0210813 A1 | 8/2010 | Foder et al. |

FOREIGN PATENT DOCUMENTS

| | | |
|---|---|---|
| JP | S6123627 A | 2/1986 |
| JP | S6339926 A | 2/1988 |
| JP | S63243134 A | 10/1988 |
| JP | H05222197 A | 8/1993 |
| JP | 2001261833 A | 9/2001 |
| JP | 2002039462 A | 2/2002 |
| JP | 2005264018 A | 9/2005 |
| JP | 2008081542 A | 4/2008 |
| WO | WO2006027985 A1 | 3/2006 |

OTHER PUBLICATIONS

First Office Action for PCT/JP2015/076779/JP2016-550323, dated Mar. 14, 2017, by the Japanese Patent Office.
Translation of First Office Action entitled Notification of Reasons for Refusal for PCT/JP2015/076779/JP2016-550323, dated Mar. 14, 2017, by the Japanese Patent Office.

* cited by examiner

POLYARYLENE SULFIDE PRODUCTION DEVICE PROVIDED WITH SUPPLY TUBE

TECHNICAL FIELD

The present invention relates to an enhancement of a polyarylene sulfide production device provided with a reaction vessel equipped with a supply tube. More particularly, the present invention relates to an enhancement of a polyarylene sulfide production device provided with a supply tube for loading a corrosive material such as a strong alkali into the reaction vessel.

BACKGROUND ART

Polyarylene sulfide (also called "PAS" hereinafter), represented by polyphenylene sulfide (also called "PPS" hereinafter), is an engineering plastic having excellent heat resistance, chemical resistance, flame retardancy, mechanical strength, electrical characteristics, dimensional stability, and the like. PAS has been widely used in a wide variety of fields, such as electric/electronic devices and devices for automobiles, since PAS can be formed into various molded products, films, sheets, fibers, and the like by ordinary melt processing methods, such as extrusion molding, injection molding, and compression molding.

A known representative production method for PAS is a method of obtaining PAS such as PPS by performing a polymerization reaction on a sulfur source and a dihalo aromatic compound such as p-dichlorobenzene (also called "PDCB" hereafter) while heating (for example, temperature conditions of approximately 175 to 350° C.) using an aqueous mixture containing a polar organic solvent such as N-methyl-2-pyrrolidone (also called "NMP" hereafter) (Patent Documents 1 and 2). Other known methods for producing PAS with a high molecular weight include a two-stage polymerization method of performing a polymerization reaction while changing the polymerization temperature and the water content present in the polymerization reaction system, and a method of performing polymerization using a phase separation agent as necessary (Patent Documents 3 and 4).

PAS polymerization is often performed by loading an aqueous mixture containing a sulfur source and a dihalo aromatic compound into a polymerization device in the form of a roughly cylindrical reaction vessel (also called a "polymerization vessel", a "polymerization can", a "reaction can", or the like), and it is necessary to continue to precisely control the composition of the polar organic solvent, raw material monomers, the produced PAS polymer, and the like inside the polymerization device, specifically, inside the reaction vessel, until polymerization is complete. Therefore, PAS polymerization is performed by supplying each of raw material monomers, a solvent (polar organic solvent, water, or the like), a polymerization aid, and the like from the opening end of one or a plurality of supply tubes provided at the upper part (also called a "lid" or the like) of the reaction vessel, adjusting the inside of the reaction vessel to a prescribed temperature and pressure and changing the temperature and pressure as necessary, additionally supplying raw material monomers, a solvent, or the like, and performing a polymerization reaction while sufficiently stirring. The produced PAS polymer is extracted from a discharge tube ordinarily provided at the base of the reaction vessel, and a PAS polymer product is obtained via washing, purification, or the like.

Chromium steel such as stainless steel, nickel, or the like has conventionally been used as a reaction vessel used for a polymerization reaction. However, in PAS polymerization, the reaction vessel, specifically, the inside wall of the reaction vessel, is in contact with corrosive materials such as a sulfur source or an alkali metal hydroxide, salt (NaCl), or the like in a high-temperature environment exceeding 200° C. for a long period of time. Thus, the material used to form the reaction vessel is required to have excellent corrosion resistance, chemical resistance, heat resistance, or stainless properties. Therefore, as disclosed in Patent Documents 4 to 6 and the like, in the production of PAS, a reaction device in which at least the part that comes into contact with the polymerization reaction solution is made of a titanium material or the like is considered preferable.

A reaction tube that is provided in the reaction vessel and opens into the reaction vessel is used to accurately load raw material monomers or other materials (for example, a strong alkali such as an alkali metal hydroxide) into the reaction vessel in preset prescribed amounts. Therefore, when the raw material monomers or other materials remain inside the supply tube (for example, near the tip opening) or adhere to the inside wall surface of the reaction vessel, there is a risk that the composition of the raw material monomers or the like used in the polymerization reaction may deviate from the prescribed composition. In particular, a supply tube for supplying a material (for example, various aids) in small amounts to the reaction vessel is required to have a function enabling the accurate supply of prescribed amounts.

After prescribed amounts of raw material monomers or other materials are loaded from a supply tube, a polymerization reaction or the like is performed inside the reaction vessel (as described below, a dehydration step or the like may also be performed). After the loading of an alkali metal hydroxide or the like into the reaction vessel from the opening end of the supply tube is complete, residual alkali metal hydroxide or the like may adhere to the opening end of the supply tube or the reaction vessel connected to the opening end, specifically, the inside wall surface or the like of the upper part (lid). In addition, when a polymerization reaction or the like is repeated multiple times inside the reaction vessel, the residual alkali metal hydroxide or the like adhering to the open end of the supply tube or the inside wall surface of the reaction vessel may accumulate.

It has been found that corrosion or the like may occur at the open end of the supply tube or the inside wall surface of the reaction vessel due to continuous contact with an accumulated alkali metal hydroxide or the like over a long period of time in the environment inside the reaction vessel. That is, as a result of continuous contact with a high-concentration strong alkali in a high-temperature and pressure environment exceeding 200° C., and as a result of the contact or accumulation of NaCl as a by-product and contact with hydrogen sulfide in the PAS production device, corrosion or the like may occur even with a material such as titanium which has excellent chemical resistance or corrosion resistance (an example of which is zirconium or the like, which is known as a corrosion-resistant material belonging to titanium-group elements).

When corrosion occurs at the open end of the supply tube or on the inside wall surface of the reaction vessel, there is a risk that corrosion will also progress to portions above the open end of the supply tube or inward in the thickness direction from the inside wall surface of the reaction vessel, which may diminish the safety of the reaction vessel as a pressure vessel. That is, when the mechanical strength required of the reaction vessel is lost due to corrosion, there is a risk that this may lead to an accident such as the breakage or destruction of the container or the leakage of the contents thereof. When the reaction vessel is formed using a laminated material such as titanium-clad steel as a based material, the loss of the titanium layer of the surface due to corrosion may cause the corrosion of the base material to progress with increasing speed. Further, there is a risk that a strong alkali, NaCl, or corroded strips accumulated on corroded parts such as the inside wall surface of the reaction vessel or the supply tube may drop into the reaction vessel, and in this case, there is a substantial risk of causing a decrease in the quality of the produced polymer such as PAS. Therefore, before the corrosion of the open end of the supply tube or the inside wall surface of the reaction vessel progresses, it is necessary to stop the operation of the reaction device and clean the open end and inside of the supply tube or the inside wall of the reaction vessel or to remove accumulated matter. In the event that the corrosion of the inside of the supply tube or the wall surface of the reaction vessel has progressed, it is necessary to stop the operation of the reaction device for a long period of time and replace the supply tube provided in the reaction vessel or to repair the reaction vessel. These lead to substantial decreases in production efficiency, so there is a demand for a solution.

Specifically, there is a demand to provide a PAS production device provided with a supply tube for loading corrosive materials such as a strong alkali, a strong acid, or hydrogen sulfide (also called "corrosive materials such as a strong alkali" hereafter) into a reaction vessel, wherein prescribed amounts of raw material monomers or other materials can be accurately loaded into the reaction vessel without causing decreases in production efficiency due to the replacement of the supply tube or the repair of the reaction vessel in response to the corrosion of the supply tube or the like.

CITATION LIST

Patent Literature

Patent Document 1: Japanese Examined Patent Application Publication No. S45-3368B
Patent Document 2: Japanese Unexamined Patent Application Publication No. S63-243134A
Patent Document 3: Japanese Unexamined Patent Application Publication No. S61-7332A
Patent Document 4: Japanese Unexamined Patent Application Publication No. S63-39926A
Patent Document 5: Japanese Unexamined Patent Application Publication No. S61-23627A
Patent Document 6: Japanese Unexamined Patent Application Publication No. 2005-264018A

SUMMARY OF INVENTION

Technical Problem

An object of the present invention is to provide a PAS production device provided with a supply tube for loading corrosive materials such as a strong alkali into a reaction vessel, wherein prescribed amounts of raw material monomers or other materials can be accurately loaded into the reaction vessel without causing decreases in production efficiency due to the replacement of the supply tube or the repair of the reaction vessel in response to the corrosion of the supply tube or the like.

Solution to Problem

As a result of conducting dedicated research to achieve the object described above, the present inventors discovered that the problems described above can be solved by improving the structure of the supply tube provided in the reaction vessel, and thereby completed the present invention.

That is, the present invention provides (1) a PAS production device including a reaction vessel equipped with one or a plurality of supply tubes;
at least one of the supply tubes having an insert pipe to be inserted into an outer supply tube; and
a tip opening of the insert pipe being positioned further inward than an inside wall of the reaction vessel.

In addition, the present invention provides the production devices of (2) to (8) below as specific aspects of the invention.

(2) The production device according to (1), wherein at least a part of the tip opening is positioned above a liquid surface of a reaction solution inside the reaction vessel; and an orientation of the tip opening is set so that a flow of a supply liquid supplied from the insert pipe via the tip opening does not face the inside wall of the reaction vessel positioned above the liquid surface.

(3) The production device according to (1) or (2), wherein at least a part of the tip opening is positioned above a liquid surface of a reaction solution inside the reaction vessel; and a normal line facing the outside of the insert pipe from the inside of the insert pipe at each point on a plane formed by the tip opening does not intersect the inside wall of the reaction vessel positioned above the liquid surface.

(4) The production device according to any one of (1) to (3), wherein when a middle point of a geometric center of gravity of an upper end of the tip opening and a geometric center of gravity of a lower end of the tip opening is defined as middle point A, an intersection of a horizontal plane passing through middle point A and a vertical center axis of the reaction vessel is defined as intersection B, and an orientation from intersection B to middle point A along a straight line connecting intersection B and middle point A is defined as orientation BA, an area of an orthogonal projection formed by a visible portion of the tip end in orientation BA on a plane perpendicular to orientation BA is not less than 1 cm$^2$.

(5) The production device according to any one of (1) to (4), wherein the insert pipe is detachably inserted into the outer supply tube.

(6) The production device according to any one of (1) to (5), wherein the insert pipe is formed from a titanium material or a zirconium material.

(7) The production device according to any one of (1) to (6), wherein a velocity vector of a supply liquid discharged from the insert pipe at the tip opening of the insert pipe is inclined with respect to a horizontal plane.

(8) The production device according to any one of (1) to (6), wherein a tangent at each point on a plane formed by the tip end being inclined with respect a horizontal plane.

(9) The production device according to any one of (1) to (8), wherein the insert pipe has a curved part in a portion thereof.

The present invention further provides (10) a method of producing PAS using the production device described in any one of (1) to (9).

Advantageous Effects of Invention

The present invention yields the effect that it is possible to provide a PAS production device provided with a supply tube for loading corrosive materials such as a strong alkali into a reaction vessel, wherein prescribed amounts of raw material monomers or other materials can be accurately loaded into the reaction vessel without causing decreases in production efficiency due to the replacement of the supply tube or the repair of the reaction vessel in response to the corrosion of the supply tube or the like.

DESCRIPTION OF EMBODIMENTS

Figure 1:
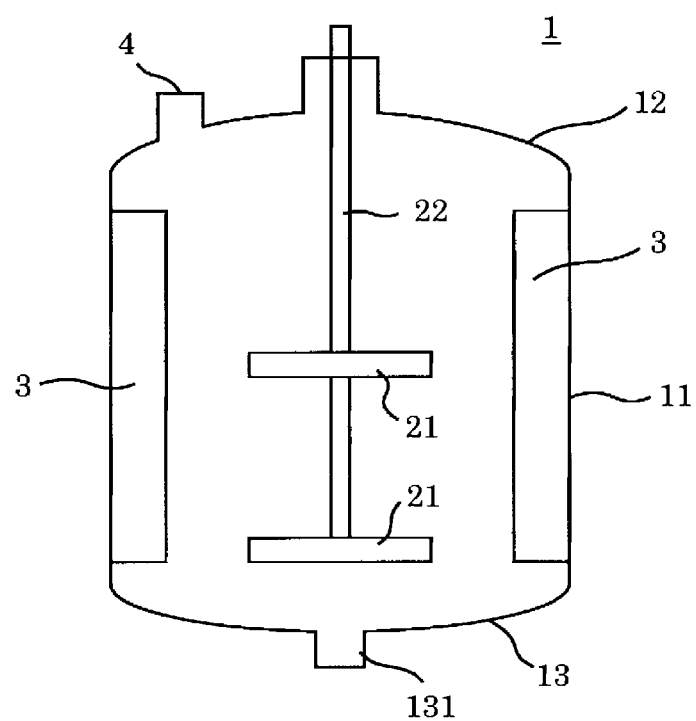
FIG. 1 is a schematic cross-sectional view illustrating a specific example of a reaction vessel provided in the PAS production device of the present invention.

The production device of the present invention can be applied to a PAS production device for performing a polymerization reaction by loading a corrosive material such as a strong alkali into a reaction vessel. The method for producing PAS will be described hereinafter using a specific example of a PAS production device for performing a polymerization reaction by loading a strong alkali into a reaction vessel.

I. Polyarylene Sulfide Production Raw Materials and the Like

1. Sulfur Source:

In the PAS production device of the present invention, the sulfur source used to produce PAS may be a publicly known compound used in the production of PAS. Examples thereof include alkali metal sulfides, alkali metal hydrosulfides, and hydrogen sulfide.

Examples of alkali metal hydrosulfides include lithium hydrosulfide, sodium hydrosulfide, potassium hydrosulfide, rubidium hydrosulfide, cesium hydrosulfide, and mixtures of two or more types thereof. Of these, sodium hydrosulfide and lithium hydrosulfide are preferred from the perspective of being available at low cost for industrial purposes.

When the sulfur source contains an alkali metal hydrosulfide, an alkali metal hydroxide is used as well. Examples of alkali metal hydroxides include lithium hydroxide, sodium hydroxide, potassium hydroxide, rubidium hydroxide, cesium hydroxide, and mixtures of two or more types there. All of these have a risk of corroding titanium, zirconium, or the like due to contact for a long period of time in a high-temperature atmosphere in a high-concentration state. Sodium hydroxide and lithium hydroxide are preferable as alkali metal hydroxides from the perspective of being available at low cost for industrial purposes.

Examples of alkali metal sulfides include lithium sulfide, sodium sulfide, potassium sulfide, rubidium sulfide, cesium sulfide, and mixtures of two or more types thereof. The alkali metal sulfide may be in the form of an anhydrate, hydrate, or aqueous solution. Of these, sodium sulfide is preferable from the perspective of being available at low cost for industrial purposes. As these alkali metal sulfides, alkali metal sulfides that are ordinarily commercially available in the form of hydrates can be used in addition to those contained as byproducts in the alkali metal hydrosulfide.

A small amount of alkali metal hydrosulfide may be contained in the alkali metal sulfide. A small amount of alkali metal sulfide may be contained in the alkali metal hydrosulfide. In these cases, the total molar amount of the sulfur source consisting of alkali metal sulfide and alkali metal hydrosulfide is that of the sulfur source supplied for the polymerization reaction in the polymerization step after the dehydration step implemented where necessary; in other words the "charged sulfur source". When the alkali metal sulfide and alkali metal hydrosulfide are mixed and used, the mixture of the two will be the charged sulfur source.

2. Dihalo Aromatic Compound:

The dihalo aromatic compound used to produce PAS may be a known compound used in the production of PAS. Examples thereof include dihalobenzenes such as p-dihalobenzene; alkyl-substituted dihalobenzenes such as o-dihalotoluene, p-dihalotoluene, o-dihaloxylene, and 1-ethyl-2,5-dihalobenzene; aryl-substituted dihalobenzenes such as 1-phenyl-2,5-dihalobenzene; dihalobiphenyls such as 4,4'-dihalobiphenyl; and dihalonaphthalenes such as 1,4-dihalonaphthalene, 1,5-dihalonaphthalene, and 2,6-dihalonaphthalene. The dihalo aromatic compound is preferably p-dichlorobenzene (PDCB), which is a p-dihalobenzene having a chlorine atom as the halogen atom.

The amount of the dihalo aromatic compound used is ordinarily from 0.9 to 1.5 mol and preferably from 0.92 to 1.2 mol per 1 mol of the sulfur source. When a branching agent described below is used, the total number of moles of the dihalogenated aromatic compound and the branching agent is ordinarily from 0.9 to 1.5 mol and preferably from 0.95 to 1.2 mol per 1 mol of the sulfur source.

3. Polar Organic Solvent:

Preferable examples of the polar organic solvent used as a solvent for the polymerization reaction in order to produce PAS include amide compounds, lactam compounds, urea compounds, organic sulfur compounds, and cyclic organic phosphorus compounds, which are aprotic polar organic solvents.

Specific examples thereof include amide compounds such as N,N-dimethylformamide and N,N-dimethylacetamide; N-alkylcaprolactam compounds such as N-methyl-$\epsilon$-caprolactam; N-alkylpyrrolidone compounds or N-cycloalkylpyrrolidone compounds such as N-methyl-2-pyrrolidone (NMP) and N-cyclohexyl-2-pyrrolidone; N,N-dialkylimidazolidinone compounds such as 1,3-dialkyl-2-imidazolidinone; tetraalkyl urea compounds such as tetramethyl urea; and hexaalkylphosphoric triamide compounds such as hexamethylphosphoric triamide. In addition, examples of organic sulfur compounds include dimethylsulfoxide and diphenylsulfone, and an example of a cyclic organic phosphorus compound includes 1-methyl-1-oxophosphorane.

One type of polar organic solvent may be used alone, or two or more types may be mixed, and the solvents may also be used after being further mixed with other solvent components that do not inhibit the object of the present invention. Of the various aprotic organic solvents described above, N-alkylcaprolactam compounds and N-alkylpyrrolidone compounds are preferable, and N-methyl-2-pyrrolidone (NMP) is particularly preferable. The amount of the polar organic solvent that is used is ordinarily in the range of from 0.05 to 10 kg, preferably from 0.1 to 1 kg, more preferably from 0.2 to 0.8 kg, and even more preferably from 0.25 to 0.6 kg per 1 mol of the sulfur source.

4. Molecular Weight Adjusting Agent, Branching/Crosslinking Agent:

A publicly known molecular weight adjusting agent or branching/crosslinking agent may be used in combination as desired to produce PAS.

5. Polymerization Aid:

In the PAS production device of the present invention, various polymerization aids may be used as necessary in the production of PAS.

6. Phase Separation Agent:

In the PAS production device of the present invention, various phase separation agents may be used to induce phase separation so as to obtain a granular PAS. Phase separation agents are compounds that dissolve in a polar organic solvent either on their own or in the presence of a small amount of water, and reduce the solubility of PAS in a polar organic solvent. The phase separation agent itself is a compound that is not a PAS solvent.

A publicly known compound that is known to function as a phase separation agent may be used as the phase separation agent. Phase separation agents include the compounds used as the above described polymerization aid, but here, "phase separation agent" indicates a compound that can be used in the quantitative ratio that functions as a phase separation agent in a step that implements a polymerization reaction in a phase-separated state, in other words, a phase-separated polymerization step, or in the quantitative ratio sufficient to cause phase separation in the present of the phase separation agent after the completion of polymerization. Specific examples of preferable phase separation agents include at least one type selected from the group consisting of organic carboxylic acid metal salts, organic sulfonic acid metal salts, alkali metal halides such as halogenated lithium, alkaline earth metal halides, alkaline earth metal salts of an aromatic carboxylic acid, phosphoric acid alkali metal salts, alcohols, paraffin hydrocarbons, and water. Preferred examples of organic carboxylic acid metal salts include lithium acetate, sodium acetate, potassium acetate, sodium propionate, lithium valerate, lithium benzoate, sodium benzoate, sodium phenyl acetate, and alkali metal carboxylates such as potassium p-tolulate. These phase separation agents may be used alone, or in a combination of two or more types. Of these phase separation agents, either water, which is inexpensive to obtain and easy to post-process, or a mixture of water and an organic carboxylic acid metal salt such as alkali metal carboxylate is particularly preferred.

Even when water is used as the phase separation agent, a phase separation agent in addition to water can be used as a polymerization aid in combination with water, from the perspective of implementing phase-separated polymerization efficiently. When both water and a phase separation agent are used together in the phase-separated polymerization step, the total amount thereof may be any amount that allows phase separation to be implemented. At least part of the phase separation agent may be contained from the time the polymerization reaction component is prepared, but it is preferable to add the phase separation agent during the polymerization reaction, or to adjust the amount of the phase separation agent to an amount sufficient to form phase separation after the polymerization reaction.

II. Polyarylene Sulfide Production Method

The method for producing PAS is not particularly limited as long as the method does not deviate from the gist of the present invention and is typically a PAS production method including a charging step and a polymerization step (may also be a two-stage polymerization step consisting of pre-stage polymerization step and a post-stage polymerization step), and preferably a method further including a dehydration step.

1. Dehydration Step

When producing PAS, a dehydration step of discharging at least a part of a distillate containing water from a system containing a mixture of a polar organic solvent, a sulfur source, and an alkali metal hydroxide when an alkali metal hydrosulfide is used as a sulfur source, in particular, to outside the system by heating the mixture is preferably performed prior to the charging step. The polymerization reaction of the sulfur source and the dihalo aromatic compound is affected by the water content present in the polymerization reaction system. Therefore, typically, the water content in the polymerization reaction system is preferably adjusted by performing the dehydration step before the polymerization step.

In the dehydration step, at least part of a distillate containing water (ordinarily containing water and a polar organic solvent) is discharged from a system containing a mixture of a polar organic solvent, a sulfur source (preferably a sulfur source containing an alkali metal hydrosulfide), and at least a part of the total charged amount of the alkali metal hydroxide to outside the system by heating the mixture preferably in an inert gas atmosphere while heating for ordinarily from 15 minutes to 24 hours and preferably from 30 minutes to 10 hours within a temperature range of ordinarily not higher than 300° C. and preferably from 100 to 250° C. The water content that should be dehydrated during the dehydration step includes hydrated water contained in the raw materials charged in the dehydration step, aqueous medium of aqueous mixture, water produced by a side reaction between the raw materials, and the like. The dehydration step may be performed using the reaction vessel used to perform the charging step and the polymerization step or using another device but is preferably performed in the reaction vessel.

In the dehydration step, the sulfur source and the water are reacted by heating to produce hydrogen sulfide and an alkali metal hydroxide, thereby volatilizing the gaseous hydrogen sulfide. Accordingly, the amount of the sulfur source in the mixture remaining in the system after the dehydration step decreases relative to the amount of the charged sulfur source. The sulfur source in the mixture remaining in the system after the dehydration step is also called the "effective sulfur source", and the effective sulfur source corresponds to the "charged sulfur source" in the charging step and the subsequent polymerization step (also simply called the "sulfur source" hereafter). The effective sulfur source after the dehydration step is a mixture containing the alkali metal hydrosulfide, the alkali metal sulfide, and the like; and specific form thereof is not particularly limited.

In the dehydration step, water contents such as hydrated water, water medium, and byproduct water, are dehydrated until the content is within the range of the required amount. In the dehydration step, the dehydration is preferably performed until the content becomes preferably 0 to 2 mol, and more preferably from 0.5 to 1.8 mol, per 1 mol of the effective sulfur source.

2. Charging Step

The method for producing PAS is performed via the following charging step after the dehydration step is performed as desired. The charging step is a step of preparing a charged mixture containing a polar organic solvent, the sulfur source and dihalo aromatic compound described above, and water, wherein a mixture of these prescribed compositions, that is, a charged mixture, is prepared by further adding an alkali metal hydroxide as necessary to the components of the mixture described above.

Charging into the reaction vessel is typically performed in a temperature range of from approximately 20° C. to 300° C. and preferably from approximately 20° C. to 200° C.

The content of the dihalo aromatic compound in the charged mixture is ordinarily a ratio (also called the "charged molar ratio" hereafter) of from 0.9 to 1.5 mol, preferably from 0.92 to 1.2 mol, and more preferably from 0.95 to 1.1 mol per 1 mol of the sulfur source. When the charged molar ratio of the dihalo aromatic compound to the sulfur source is too large, it becomes difficult to produce a high molecular weight PAS. On the other hand, when the charged molar ratio of the dihalo aromatic compound to sulfur source is too small, it becomes easier for a degradation reaction to occur, and difficult to implement a stable polymerization reaction.

In the charging step, when an alkali metal hydroxide is to be added, it is preferable to prepare a charged mixture containing an alkali metal hydroxide in an amount of from 0.75 to 1.2 mol per 1 mol of the sulfur source, and the mixture more preferably contains from 0.8 to 1.1 mol of an alkali metal hydroxide. In addition, in the charging step, it is preferable to prepare a charged mixture containing water in an amount of from 0.02 to 2 mol per 1 mol of the sulfur source, and water is added as necessary so that the mixture contains more preferably from 0.05 to 1.9 mol and even more preferably from 0.5 to 1.8 mol of water.

Further, in the charging step, the amount of the polar organic solvent is ordinarily within the range of from 0.05 to 10 kg, preferably from 0.1 to 1 kg, and more preferably from 0.2 to 0.8 kg per 1 mol of the sulfur source.

3. Polymerization Step

In the method for producing PAS, a polymerization step is performed after the charging step. In the polymerization step, the charged mixture prepared in the aforementioned charging step is heated typically to a temperature of from 170 to 290° C., preferably from 180 to 280° C., and more preferably from 190 to 275° C. before the polymerization reaction is started, in order to progress the polymerization. The polymerization reaction time is typically in the range of from 10 minutes to 50 hours and preferably from 20 minutes to 30 hours.

A polymerization reaction is preferably performed in a two-stage step including a pre-stage polymerization step and a post-stage polymerization step. Specifically, the two-stage polymerization step consists of a pre-stage polymerization step of initiating a polymerization reaction by heating the charged mixture so as to produce a prepolymer with a dihalo aromatic compound conversion rate of not less than 50%, preferably from 50 to 99.5%, and more preferably from 80 to 99.3%; and a post-stage polymerization step of heating the prepolymer to a temperature of from 245 to 290° C. and more preferably to a temperature of from 255 to 285° C. and continuing the polymerization reaction, typically in a state in which water is present in an amount of from 4 to 20 mol per 1 kg of the polar organic solvent.

The polymerization reaction is preferably performed in the presence of a phase separation agent. In particular, the method may include a polymerization step of performing a polymerization reaction on the dihalo aromatic compound and the sulfur source in the polar organic solvent in a state of being phase-separated into a produced polymer dense phase and a produced polymer dilute phase in the polymerization reaction system in the presence of a phase separation agent. The phase separation agent is preferably water, as described above, or any compound known to function as a phase separation agent.

In addition, it is preferable to perform a polymerization reaction on the dihalo aromatic compound and the sulfur source in the polar organic solvent at a temperature of from 170 to 270° C., to add a phase separation agent to the polymerization reaction mixture at the point when the dihalo aromatic compound conversion ratio reaches at least 50% so as to introduce a phase separation agent into the polymerization reaction system, and to heat the polymerization reaction mixture and continue the polymerization reaction in a state in which the mixture is phase-separated into a produced polymer dense phase and a produced polymer dilute phase in the polymerization reaction system in the presence of a phase separation agent at a temperature of from 245 to 290° C.

Furthermore, in the polymerization step, the polymerization reaction is preferably performed in at least a two-stage polymerization step including: a pre-stage polymerization step of performing a polymerization reaction on the dihalo aromatic compound and the sulfur source in the polar organic solvent so as to produce a polymer having a dihalo aromatic compound conversion ratio of not less than 50%, preferably from 50 to 99.5%, and more preferably from 80 to 99.3%; and a post-stage polymerization step of continuing the polymerization reaction in a state in which the mixture is phase-separated into a produced polymer dense phase and a produced polymer dilute phase in the polymerization reaction system in the presence of a phase separation agent.

Specifically, in the polymerization step, the polymerization reaction may be performed in at least a two-stage polymerization step including: a pre-stage polymerization step of performing a polymerization reaction on the sulfur source and the dihalo aromatic compound in the polar organic solvent at a temperature of from 170 to 270° C. in a state in which water is present in an amount of from 0.02 to 2 mol per 1 mol of the sulfur source (ordinarily corresponding to a state in which water is present in an amount of from 0.1 to 5.5 mol per 1 kg of the polar organic solvent) so as to produce a polymer having a dihalo aromatic compound conversion ratio of from 80 to 99.3%; and a post-stage polymerization step of adding a prescribed amount of water and an alkali metal hydroxide as necessary to adjust the amount of water in the polymerization system so that water is present in an amount of from 4 to 20 mol per 1 kg of the polar organic solvent, and heating the polymer to a temperature of from 245 to 290° C. so as to continue the polymerization reaction in a state in which the mixture is phase-separated into a produced polymer dense phase and a produced polymer dilute phase in the polymerization reaction system.

The dihalo aromatic compound conversion ratio is a value calculated by the following equations. In the case where the dihalo aromatic compound is added in an excessive amount in terms of the molar ratio in comparison to the sulfur source, the conversion ratio is calculated by the following equation: conversion ratio=[[dihalo aromatic compound charged amount (mol)−dihalo aromatic compound residual amount (mol)]/[dihalo aromatic compound charged amount (mol)−dihalo aromatic compound excess amount (mol)]]×100. In other cases, the conversion ratio is calculated by the following equation: conversion ratio=[[dihalo aromatic compound charged amount (mol)−dihalo aromatic compound residual amount (mol)]/[dihalo aromatic compound charged amount (mol)]]×100.

As described above, the amount of coexisting water in the reaction system in the pre-stage polymerization step is typically within the range of from 0.02 to 2 mol, preferably from 0.05 to 1.9 mol, and more preferably from 0.5 to 1.8 mol per 1 mol of the sulfur source.

In the pre-stage polymerization step, it is typically preferable to produce a polymer (sometimes called a "prepolymer") having a melt viscosity of from 0.1 to 30 Pa·s as measured at a temperature of 310° C. and a shear speed of 1216 sec$^{-1}$.

Next, a post-stage polymerization step is performed, ordinarily by adding a prescribed amount of water and an alkali metal hydroxide as necessary, in order to cause an increase in the degree of polymerization of the polymer (prepolymer) produced in the pre-stage polymerization step. The polymerization temperature in the post-stage polymerization step is in the range of from 245 to 290° C. When the polymerization temperature is below 245° C., it is difficult to obtain PAS having a high degree of polymerization, while when it exceeds 290° C., the PAS or the polar organic solvent may be degraded. In particular, the temperature range of 250 to 270° C. is preferable in that a PAS having a high degree of polymerization is easy to obtain.

As described above, in the post-stage polymerization step, the phase separation agent is preferably water, an organic carboxylic acid metal salt, or a combination thereof, and it is particularly preferable to use water. It is preferable to adjust the amount of water in the polymerization reaction system by adding water as a phase separation agent so that water is present in an amount of from 4 to 20 mol, preferably from 4.1 to 15 mol, and more preferably from 4.2 to 10 mol per 1 kg of the polar organic solvent. In the post-stage polymerization step, when the amount of coexisting water in the polymerization reaction system is less than 4 mol or greater than 20 mol per 1 kg of the polar organic solvent, the degree of polymerization of the produced PAS may fall. In particular, it is preferable for the post-stage polymerization to be implemented with the amount of coexisting water in the range of 4.3 to 9 mol in that PAS with a high degree of polymerization will be obtained.

When water is used as a phase separation agent, the amount of water in the polymerization reaction system is adjusted to within the range of from 0.05 to 30 mol, preferably from 0.1 to 20 mol, more preferably from 0.15 to 15 mol, and even more preferably from 0.2 to 12 mol per 1 kg of the polar organic solvent.

4. Post-Treatment Steps (Separation Step, Washing Step, Recovery Step, and the Like):

In the PAS production method, post-treatment steps after the polymerization reaction may be performed using conventional methods. For example, after the completion of the polymerization reaction and after a slurry containing the produced PAS polymer is diluted with water as necessary while in a high-temperature state or after cooling, it is possible to perform a separation step of separating the PAS polymer by sieving or the like, followed by a washing step of repeatedly washing and filtering the separated PAS polymer with the same polar organic solvent as the polymerization solvent, an organic solvent such as a ketone (for example, acetone) or an alcohol (for example, methanol), or hot water, and then a recovery step or the like of recovering the PAS by drying the product thereafter. The produced PAS may be treated with acids or salts such as ammonium chloride. With this method, since it is also possible to produce a particulate polymer, a method of sieving using a screen, in which the polymer can be easily separated from byproducts, oligomers, and the like, is preferably used to separate the particulate polymer from the reaction solution.

III. Polyarylene Sulfide Production Device

The PAS production device of the present invention is a PAS production device provided with a reaction vessel equipped with one or a plurality of supply tubes, at least one of the supply tubes having an insert pipe to be inserted into an outer supply tube; and a tip opening of the insert pipe being positioned further inward than an inside wall of the reaction vessel.

This will be described hereinafter with reference to the drawings.

1. Reaction Vessel

The PAS production device of the present invention is provided with a reaction vessel 1 illustrated in FIG. 1. As a PAS production method to be performed by applying the PAS production device of the present invention, the reaction vessel 1 is used, and at least a charging step and a polymerization step are performed in the reaction vessel 1 (therefore, the reaction vessel 1 is also called a "polymerization vessel" or a "polymerization can"). A dehydration step is performed as desired.

The same shape, structure, size, and the like as those of the reaction vessel provided and used in a conventional PAS production device may be applied to the reaction vessel 1 provided in the PAS production device of the present invention, and the reaction vessel 1 may also be formed from the same materials. That is, the reaction vessel 1 ordinarily has a structure including a cylindrical body 11, a lid 12, and a base 13. A mixing impeller 21 and a stirring shaft 22 are ordinarily inserted into the reaction vessel 1, and one or a plurality of baffles (baffle boards) 3 are provided on the inner peripheral wall. The stirring shaft 22 is connected to an electric motor (not illustrated) disposed above the reaction vessel 1 and is rotatably driven.

Lid

The lid 12 of the reaction vessel 1 is ordinarily a bowl-shaped member connected and attached to the upper part of the cylindrical body 11, and the lid is provided with a hole into which the stirring shaft 22 of the mixing impeller 21 described below is inserted. As described in detail below, the lid 12 of the PAS polymerization device of the present invention (polymer polymerization device) is provided with one or a plurality of supply tubes 4 (also called "supply nozzles") for loading raw material monomers or other materials (including alkali metal hydroxides or the like; raw material monomers or other materials are also collectively called "various raw materials or the like" hereafter) into the reaction vessel 1 (in FIG. 1, one supply tube 4 is illustrated). In addition, in order to make it possible to inspect and clean the inside of the reaction vessel 1, the lid 12 may also be provided with an opening or the like which can be opened and closed. The opening that can be opened and closed ordinarily has a larger diameter than that of the supply tube 4. If desired, the lid 12 may also be provided with the required number of baffle fixing parts for suspending and fixing baffles 3 disposed inside the reaction vessel 1.

Base

The base 13 of the reaction vessel 1 is ordinarily a bowl-shaped member connected and attached to the lower part of the cylindrical body 11. The base 13 is ordinarily provided with a discharge tube 131 (also called a "discharge nozzle") for discharging the PAS polymer produced by a polymerization reaction and may be further provided with a supply tube for loading various raw materials or the like into the reaction vessel 1 as desired.

Cylindrical Body

The cylindrical body 11 of the reaction vessel 1 constitutes the main part of the reaction vessel 1, and the charging step, the polymerization step, and, as desired, the dehydration step are performed therein. Mixing impellers 21, a stirring shaft 22, and baffles (baffle boards) 3 are ordinarily disposed inside the cylindrical body 11. In FIG. 1, the baffles 3 are directly attached to the inside wall of the cylindrical body 11. However, the baffles 3 may be supported by baffle supports provided in a protruding manner on the inside wall of the reaction vessel 1, specifically, the inside wall of the cylindrical body 11, or may be suspended and fixed from the lid 12 as mentioned above.

Other Members

The PAS production device is ordinarily connected to a reaction vessel 1 provided with a cylindrical body 11, a lid 12, and a base 13, and other necessary members are also provided. The electric motor which rotates the stirring shaft 22 described above is one example thereof. Further, a heat exchange jacket for adjusting the temperature of the reaction vessel 1, the cylindrical body 11, in particular, may be provided so as to enclose the outer circumferential surface of the reaction vessel 1. In addition, various piping may be provided for purposes such as the transfer of various raw materials or the PAS polymer, the circulation of a heating medium and/or a coolant, or the like.

The material for forming the reaction vessel 1 of the PAS production device is required to be a material having excellent strength or chemical resistance in a high-temperature environment since the PAS polymerization reaction is performed in a high-temperature, high-pressure, and high-alkaline environment. Specific examples include corrosion-resistant metals such as titanium (or titanium alloys; same hereafter), zirconium (or zirconium alloys; same hereafter in the present invention), or special austenitic steel (such as Carpenter (trade name)), and a laminate in which these plate-like materials or corrosion-resistant metals such as titanium or zirconium are provided on the inside surface of the reaction vessel 1, for example, a titanium-coated steel material or clad steel, may be used. The thickness or size of the plate-like material of the corrosion-resistant metal (including clad steel) is determined appropriately as necessary. This is also the same for the material for forming members or the like of the baffles 3 or the like disposed in the reaction vessel 1.

2. Supply Tube

The PAS production device of the present invention is a PAS production device provided with a reaction vessel 1 equipped with one or a plurality of supply tubes 4, at least one of the supply tubes 4 having an insert pipe to be inserted into an outer supply tube; and a tip opening of the insert pipe being positioned further inward than an inside wall of the reaction vessel. This will be described hereinafter with reference to the drawings.

As illustrated in FIG. 1, the reaction vessel 1, specifically, the lid 12, of the PAS production device of the present invention is provided with one or a plurality of supply tubes 4 for loading various raw materials such as raw material monomers or an alkali metal hydroxide into the reaction vessel 1. In FIG. 1, only one supply tube 4 is illustrated, but the required number of supply tubes 4 are ordinarily provided while taking into consideration the types of the various raw materials and the like supplied to the reaction vessel 1.

Figure 2:
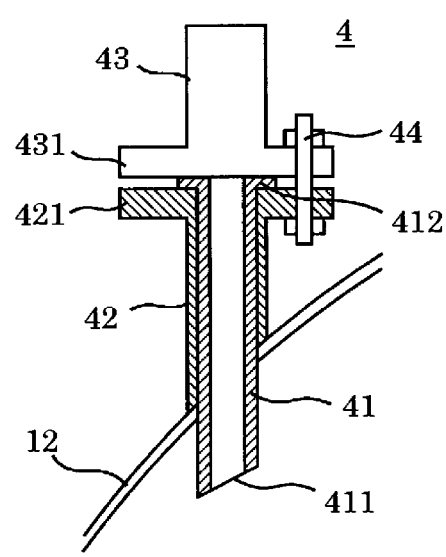
FIG. 2 is a schematic cross-sectional view illustrating a specific example of a supply tube equipped in the reaction vessel provided in the PAS production device of the present invention.

Further, as illustrated in FIG. 2, at least one of the supply tubes 4 has an insert pipe 41 to be inserted into an outer supply tube 42, and a tip opening 411 of the insert pipe 41 is positioned further inward than an inside wall of the reaction vessel 1. As long as the insert pipe 41 has a structure that is inserted into the outer supply tube 42, the insert pipe 41 may be formed integrally with the outer supply tube 42 or as a separate unit. When the insert pipe 41 and the outer supply tube 42 are separate units, the insert pipe 41 and the outer supply tube 42 may be configured detachably or configured with a structure in which attachment and detachment are not envisioned. As illustrated in the drawing, the supply tube 4 may be provided in the vertical direction, but the attachment direction may differ so that the supply tube is attached in a direction perpendicular to the outer surface of the lid 12, for example.

Insert Pipe

The tip opening 411 of the insert pipe 41 which is inserted into the outer supply tube 42 and is preferably detachable is positioned further inward than the inside wall of the reaction vessel 1, and the flow of the supply liquid is set to the direction of the opening so that it does not face the inside wall. This yields the effect described above, specifically, the effect that since there is no risk that the various raw materials or the like such as an alkali metal hydroxide supplied to the reaction vessel 1 from the supply tube 4 will adhere to the inside wall of the lid 12 of the reaction vessel 1. Therefore, the alkali metal hydroxide or the like supplied from the supply tube 4 is not condensed and accumulated on the inside wall of the lid 12 of the reaction vessel 1. The effect described above is achieved as a result of the tip opening 411 of the insert pipe 41, which is inserted into the outer supply tube 42 ad is preferably detachable, being positioned further inward than the inside wall of the reaction vessel 1, at least a portion of the tip opening 411 being positioned above the liquid surface of the reaction solution inside the reaction vessel 1, and the orientation of the tip opening 411 being set so that the flow of the supply liquid supplied from the insert pipe 41 via the tip opening 411 does not face the inside wall of the reaction vessel 1 positioned above the liquid surface. In addition, the effect described above is achieved as a result of the tip opening 411 of the insert pipe 41, which is inserted into the outer supply tube 42 and is preferably detachable, being positioned further inward than the inside wall of the reaction vessel 1, at least a portion of the tip opening 411 being positioned above the liquid surface of the reaction solution inside the reaction vessel, and the normal line, which faces the outside of the insert pipe 41 from the inside of the insert pipe 41 at each point on a plane formed by the tip opening 411, not intersecting the inside wall of the reaction vessel 1 positioned above the liquid surface. Further, the effect described above is achieved when a middle point of a geometric center of gravity of an upper end of the tip opening 411 and a geometric center of gravity of a lower end of the tip opening 411 is defined as middle point A, an intersection of a horizontal plane passing through middle point A and a vertical center axis of the reaction vessel is defined as intersection B, and an orientation from intersection B to middle point A along a straight line connecting intersection B and middle point A is defined as orientation BA, wherein an area of an orthogonal projection formed by a visible portion of the tip end 411 in orientation BA on a plane perpendicular to orientation BA is not less than 1 cm$^2$. In this specification, a horizontal plane refers to a plane perpendicular to the direction in which gravity acts. The length of the projection of the insert pipe 41 from the inside wall of the reaction vessel 1 (also called the "projection length" hereafter) is ordinarily not less than 1 cm, preferably not less than 2 cm, and more preferably not less than 3 cm from the perspective of reliably preventing various raw materials (including raw materials splashing back from the liquid surface of the reaction solution inside the reaction vessel 1) from adhering to the inside wall of the reaction vessel 1 or in the gap between the insert pipe 41 and the outer supply tube 42. The optimal range of the projection length of the insert pipe 41 may be selected based on the size, shape, or the like of the reaction vessel 1. The upper limit is not particularly limited as long as the insert pipe 41 of the supply tube 4, or the various raw materials or the like such as an alkali metal hydroxide supplied from the supply tube 4, does not come into contact with the inside wall of the reaction vessel 1, the top of the baffle 3, the upper part of the stirring shaft 22, or the like. In extreme cases, it is permissible for the insert pipe 41 to extend to below the liquid surface of the reaction solution containing various raw materials or the like inside the reaction vessel 1. From the perspective of strength or the perspective of ensuring that it does not become difficult to attach the supply tube 4, which is provided with an insert pipe 41 and an outer supply tube 42 into which the insert pipe 41 is to be inserted, to the reaction vessel 1, the projection length of the insert pipe 41 is ordinarily not greater than 50 cm, in many cases not greater than 30 cm, and more preferably not greater than 20 cm. The projection length is preferably set to a length that allows the tip opening 411 of the insert pipe 41 to be above the liquid surface of the reaction solution containing raw materials or the like. In addition, the projection length of the insert pipe 41 is ordinarily within the range of from 0.5 to 10 times and in many cases from 1 to 5 times the outside diameter of the insert pipe 41.

The diameter, length, and thickness of the insert pipe 41 can be set appropriately while taking into consideration the types of the various raw materials or the like supplied from the supply tube 4, the amounts loaded into the reaction vessel 1, and the strength required of the insert pipe 41. In addition, the distance of the portion of the insert pipe 41 protruding from the inside wall of the reaction vessel 1 in the radial direction of the cylindrical body 11 of the reaction vessel 1 from inside wall of the body 11 may be set appropriately within a range so that the various raw materials or the like supplied from the supply tube 4 do not adhere to or remain on the inside wall of the reaction vessel 1, and the distance is ordinarily not less than 10 cm and in many cases not less than 15 cm. When a plurality of supply tubes 4, each provided with an insert pipe 41 which is inserted into an outer supply tube 42 and is preferably detachable, are provided in the reaction vessel 1, the diameter, length, and thickness of each of the insert pipes 41 as well as the projection length and the distance from the inside wall of the body 11 may be same or different from one another.

In FIG. 2, the velocity vector of a supply liquid discharged from the insert pipe 41 at the tip opening 411 of the insert pipe 41 is inclined with respect to the horizontal plane. As a result, so-called liquid outage of the various raw materials such as an alkali metal hydroxide supplied to the reaction vessel 1 from the supply tube 4 is improved, and there is no risk that the various raw materials or the like will remain on the inside wall of the reaction vessel 1. This makes it possible to load the prescribed amounts into the reaction vessel 1 while accurately orienting the materials, and the accumulation of an alkali metal hydroxide or the like at the tip opening 411 is also suppressed. Further, the plane formed by the tip opening 411 of the insert pipe 41 (imaginary plane defined by the inner periphery of the tip opening 411) may be a flat surface, a curved surface, a surface consisting of a combination of a plurality of flat surfaces, a surface consisting of a combination of a plurality of curved surfaces, or a surface consisting of one or more flat surfaces and one or more curved surfaces. The angle of the inclination formed by the velocity vector of the supply liquid discharged from the insert pipe 41 at the tip opening 411 with respect to the horizontal plane is preferably within the range of from 15 to 60 degrees and more preferably from 20 to 50 degrees from the perspective of liquid outage or the projection length of the insert pipe 41 from the inside wall of the reaction vessel 1. Further, the tangent at each point on a plane formed by the tip opening 411 preferably being inclined with respect to the horizontal plane. Typically, when the tip opening 411 of the insert pipe 41 is inclined, it becomes necessary to use caution when performing operations such as the insertion or removal of the insert pipe 41 into and from the outer supply tube 42 for the purpose of replacement or the like. In addition, the tip opening 411 of the insert pipe 41 is preferably attached in a direction so that there is no risk that the various raw materials such as an alkali metal hydroxide supplied from the supply tube 4 or raw materials or the like splashing back from the liquid surface of the reaction solution inside the reaction vessel 1 will come into contact with the inside wall of the reaction vessel 1, the top of the baffle 3, the upper part of the stirring shaft 22, or the like.

Although not illustrated, the insert pipe 41 has a curved part in a portion thereof. That is, as a result of the insert pipe 41 being curved with a magnitude of R from 75 to 300 mm and preferably from 100 to 200 mm, ordinarily in a direction moving away from the inside wall of the body 11 of the reaction vessel 1 and in a direction without obstacles, the liquid flow of the various raw materials or the like supplied to the reaction vessel 1 from the supply tube 4 becomes smooth, which yields the effect that it is possible to prevent the splash back of the various raw materials or the like from the liquid surface of the reaction solution and that interference with other members such as baffles 3, for example, inside the reaction vessel 1 can be avoided. The starting point of the curved part is not particularly limited as long as it is a position of the insert pipe 41 further inward than the inside wall of the reaction vessel 1, but the starting point is preferably a position from 5 to 50 mm from the tip opening 411 facing the inside wall of the reaction vessel 1. The end point of the curved part is in the vicinity of the tip opening 411 and is preferably a position from 1 to 10 mm away from the tip opening 411. Since the insert pipe 41 curves smoothly toward the tip opening 411, the insertion of the insert pipe 41 into the outer supply tube 42 is not obstructed. Since the curved part can be formed by bending the tube, welding is unnecessary, and there is no risk of a decrease in the strength or corrosion resistance of a welded part.

The insert pipe 41 is a member which comes into contact with the various raw materials or the like such as a alkali metal hydroxide supplied to the reaction vessel 1, so the insert pipe 41 is preferably formed from a corrosion-resistant material such as a titanium material or a zirconium material, and the insert pipe 41 is more preferably formed from a titanium material or a zirconium material. If desired, the outer circumferential surface of the portion of the insert pipe 41 projecting from the inside wall of the reaction vessel 1 may be surface-finished so that there is no adhesion of various raw materials or other materials.

The method or means for detachably inserting and fixing the insert pipe 41 to the outer supply tube 42 is not particularly limited as long as attachment and detachment are easy, the various raw materials or the like such as an alkali metal hydroxide do not come into contact with parts other than the insert pipe 41, the reaction solution does not come into contact with the gap between the insert pipe 41 and the outer supply tube 42 (for example, a structure in which the gap is minimized or the reaction solution is prevented from splashing back into the gap), and the mechanical strength can be ensured. However, as illustrated in FIG. 2, an example is a method of forming a flange part 412 at the end of the insert pipe 41 on the outside of the reaction vessel 1, specifically, on the outside of the lid 12, and inserting and fixing the insert pipe 41 in the outer supply tube 42 using the flange part 412.

Supply Tube Outer Tube

The outer supply tube 42, into which the insert pipe 41 is inserted, fixes the insert pipe 41 so as to prevent the shaking of the insert pipe 41 when supplying various raw materials or the like into the reaction vessel 1. Therefore, the outer supply tube 42 is a pipe-shaped tube having a cross-sectional shape in which the inside diameter of the outer supply tube 42 is roughly the same as the outside diameter of the insert pipe 41. As illustrated in FIG. 2, the outer supply tube 42 is attached to the reaction vessel 1, specifically, to the outside wall surface of the lid 12, by a method which is itself publicly known, and the flange part 412 of the insert pipe 41 can be fixed using a fixing flange part 421 formed at the tip on the outside of the reaction vessel 1. From the perspective of reliably fixing the insert pipe 41 or the perspective of reliably preventing the adhesion of the reaction solution to the fixing flange part 421, the length of the outer supply tube 42 is preferably not less than 5 cm, more preferably not less than 10 cm, and even more preferably not less than 15 cm.

The outer supply tube 42 is a member which is attached by welding or the like to the outer circumferential surface of the lid 12 of the reaction vessel 1 and is simultaneously a member whose inner circumferential surface comes into contact with the outer circumferential surface of the insert pipe 41. Therefore, from the perspective of avoiding corrosion due to galvanization between different types of metals or the generation of thermal stress due to differences in the coefficient of thermal expansion, at least the inner circumferential surface of the outer supply tube 42 in contact with the outer circumferential surface of the insert pipe 41 is preferably formed from the same material as the insert pipe 41. Specifically, it is preferably formed from a corrosion-resistant material such as a titanium material or a zirconium material. The outer circumferential surface side of the outer supply tube 42 may be formed from an appropriate material such as stainless steel or a nickel material, for example, while taking into consideration the fact that the member does not come into contact with the various raw materials or the like such as an alkali metal hydroxide supplied to the reaction vessel 1 and out of consideration of the convenience of welding or the like to the outer circumferential surface of the lid 12 of the reaction vessel 1 (in this case, the outer supply tube 42 has a laminated structure consisting of a corrosion-resistant material such as a titanium material or a zirconium material and stainless steel, a nickel material, or the like).

Supply Tube Main Body

The supply tubes 4 equipped in the reaction vessel 1 provided in the PAS production device of the present invention are not particularly limited structurally as long as at least one of the supply tubes 4 is provided with an insert pipe 41 which is inserted into the outer supply tube 42 and is preferably detachable, the tip opening 411 of the insert pipe 41 is positioned further inward than the inside wall of the reaction vessel 1, and various raw materials or the like such as an alkali metal hydroxide can be supplied into the reaction vessel 1. In FIG. 2, a supply tube 4 provided with the insert pipe 41 and outer supply tube 42 described above as well as a separate supply tube main body 43 is illustrated, but the structure of the supply tube 4 is not in any way limited to this example. For example, the outer supply tube 42 and the supply tube main body 43 may be formed integrally.

In FIG. 2, the flange part 412 of the insert pipe 41 is sandwiched by the fixing flange part 421 of the outer supply tube 42 and a fixing flange part 431 (of the supply tube main body) formed at the end of the supply tube main body 43 and is pressure-fastened with bolts and nuts 44 (only one set is illustrated, but eight sets of bolts and nuts 44 are disposed symmetrically in a peripheral manner). The method or means of pressure fastening is in no way limited to the example illustrated in FIG. 2. In FIG. 2, a gasket or seal (not illustrated) is ordinarily disposed on the contact surface of the flange part 412 and the fixing flange parts 421 and 431. In addition, since the supply tube main body 43 is a member which does not come into contact with the various raw materials or the like such as an alkali metal hydroxide supplied to the reaction vessel 1, the supply tube main body 43 may be formed from an appropriate material such as stainless steel or a nickel material, for example.

Replacement of the Insert Pipe

Since the reaction vessel 1 of the PAS production device of the present invention is equipped with the particular supply tube 4 described above, a high-concentration strong alkali does not come into contact with the supply tube 4 and the inside wall of the reaction vessel 1 for a long period of time in a high-temperature environment, so it is unnecessary to frequently repair or inspect the supply tube 4 or the reaction vessel 1. However, when performing such examinations or the like periodically, or when deposits have somehow accumulated in the insert pipe 41 or the like provided in the supply tube 4, it is possible to disconnect the insert pipe 41 and the outer supply tube 42 (for example, by removing the bolts and nuts 44 illustrated in FIG. 2), to remove the insert pipe 41 from the outer supply tube 42, to insert a new insert pipe 41 into the outer supply tube 42, and to reconstruct the supply tube 4 integrally with the supply tube main body 43 if necessary. Therefore, the time and labor required to repair the supply tube are dramatically reduced.

EXAMPLES

The present invention will be more specifically described hereinafter with reference to examples and comparative examples. Note that the present invention is not limited to these examples.

Example 1

A required number of supply tubes are disposed on a lid 12 of a reaction vessel 1 (volume: approximately 2 m$^3$) provided with an inner layer made of a titanium material, as illustrated in FIG. 1, and three of the supply tubes 4 illustrated in FIG. 2 are disposed. The supply tube 4 was used in which an insert pipe 41 formed from a titanium material with an outside diameter (corresponding to the inside diameter of the outer supply tube 42) of 9 cm, a length of 62 cm, and a thickness of 4 mm can be detachably inserted into the outer supply tube 42, and this was fixed so that a tip opening 411 (having an inclination of 30 degrees with respect to the horizontal plane) of the insert pipe 41 was positioned 14 cm inward from the inside wall of the reaction vessel 1 (positioned above the liquid surface of a reaction solution). The reaction vessel 1 was provided with a discharge tube 131 at the base 13, and mixing impellers 21, a stirring shaft 22, baffles 3, and a heat exchange jacket (not illustrated) enclosing the outer circumferential surface were provided in accordance with conventional methods. A PAS was produced in accordance with the following steps using a PAS production device provided with this reaction vessel 1.

1. Dehydration Step:

A dehydration step was performed by loading prescribed amounts of an aqueous solution of sodium hydrosulfide (NaSH) having a concentration of 62.4 mass %, an aqueous solution of sodium hydrosulfide (NaOH) having a concentration of 73.6%, and N-methyl-pyrrolidone (NMP) (0.35 kg of NMP per 1 mol of the sulfur source) into the reaction vessel 1 from the three supply tubes 4 provided in the lid 12 of the reaction vessel, replacing the inside of the reaction vessel 1 with nitrogen gas, heating to a temperature of 200° C. over the course of approximately two hours, and distilling out the water and NMP. Hydrogen sulfide equivalent to 1.6% of the sulfur source was volatilized in this dehydration step.

2. Charging Step:

After the dehydration step, the reaction vessel 1 was cooled to a temperature of 170° C., and commercially available p-dichlorobenzene (PDC) and water were respectively loaded from each of the supply tubes 4 provided in the lid 12 of the reaction vessel 1, while NaOH was further loaded from a separate supply tube 4 to obtain a charged mixture. The ratio of PDCB in the charged mixture to the sulfur source was 1.02 (mol/mol).

3. Polymerization Step:

While the preparation mixture was stirred, the temperature was continuously raised from 183° C. to 260° C. over the course of 2.5 hours to perform a polymerization reaction (pre-stage polymerization step). The conversion rate of the PDCB was 93%.

Water and NaOH were then pressed into the reaction vessel 1 (temperature: approximately 260° C.) from the respective supply tubes 4, and after this was heated to a temperature of 265° C., a polymerization reaction was performed for 2.5 hours as a form of phase-separated polymerization (post-stage polymerization step). The reaction mixture containing the PAS polymer produced in the polymerization reaction was removed from a discharge port 131 provided in the base 13 of the reaction vessel 1.

4. Post-Treatment Step:

After the reaction mixture was cooled to room temperature following the completion of the polymerization reaction, the reaction mixture was passed through a 100-mesh screen (sieve opening: 150 μm) to sieve the PAS polymer (particulate polymer). The separated PAS polymer was washed three times with acetone, then washed three times with water, washed with 0.3% acetic acid aqueous solution, and washed four times with water to obtain a washed polymer. The washed polymer was dried at a temperature of 105° C. for 13 hours.

New raw materials were loaded into the reaction vessel 1 used to produce PAS, and the aforementioned PAS production operation consisting of a dehydration step, a charging step, a polymerization step, and post-treatment steps was repeated 200 times. The thickness of the titanium material was then measured for each of the insert pipe 41 (tip opening 411 and the like) of the supply tube 4, the outer supply tube 42 (including the flange part 421), and the inside wall of the reaction vessel 1. No decrease in the thickness of the titanium material (thickness reduction) due to corrosion originating from the accumulation of deposits was observed on the inside wall of the reaction vessel 1 and the outer supply tube 42 (including the flange part 421). A decrease in thickness due to corrosion was observed in the insert pipe 41, so a decision was made to replace only the insert pipe 41.

Comparative Example 1

The PAS production operation was repeated 200 times in the same manner as in Example 1 with the exception that an insert pipe to be inserted into the outer supply tube was not provided, and that a reaction vessel 1 having a supply tube which was formed integrally from a titanium material was provided, wherein the tip opening of the supply tube opened to the inside wall of the reaction vessel 1. When the thickness of the titanium material was measured for the portion opened to the supply tube and the reaction vessel 1 and the inside wall of the reaction vessel 1 in the vicinity thereof, no decrease in thickness due to corrosion was observed at any of the sites. In particular, the titanium material was completely depleted due to corrosion on the inside wall of the reaction vessel and in the flange portion of the supply tube, and the exposure and corrosion of the base material were also observed.

It was confirmed from Example 1 and Comparative Example 1 that in the case of the PAS production device of Example 1, which is provided with a reaction vessel equipped with one or a plurality of supply tubes, at least one of the supply tubes having an insert pipe to be inserted into an outer supply tube, and a tip opening of the insert pipe being positioned further inward than an inside wall of the reaction vessel, decreases in thickness associated with corrosion originating from the accumulation of deposits are suppressed even when the PAS production operation was repeated 200 times. Therefore, with the PAS production device of Example 1, prescribed amounts of various raw materials or the like can be loaded into the reaction vessel accurately, and there is no risk of causing decreases in production efficiency due to the corrosion of the inside surface of the reaction vessel or the supply tube used to load corrosive materials such as a strong alkali into the reaction vessel over a long period of time. Further, if a supply tube needs to be replaced, it was deduced that it is only necessary to remove and replace the detachable insert pipe which is inserted into the outer supply tube.

In contrast, it was confirmed that in the case of the PAS production device of Comparative Example 1 provided with a reaction vessel equipped with a supply tube, wherein the supply tube is not provided with an insert pipe to be inserted into the outer supply tube, and the tip opening of the supply tube is opened to the inside wall of the reaction vessel, marked decreases in thickness associated with corrosion originating from the accumulation of deposits are observed in the supply tube or the inside wall of the reaction vessel when the PAS production operation is repeated 200 times. This leads to a risk that it may not be possible to accurately load various raw materials or the like into the reaction vessel, and corrosion may occur in the supply tube or on the inside wall of the reaction vessel in a relatively short period of time. In such cases, it becomes necessary to temporarily break the part welded to the reaction vessel and replace the entire supply tube or repair the inside wall of the reaction vessel, which may lead to a risk of decreasing the production efficiency.

INDUSTRIAL APPLICABILITY

The present invention is a polyarylene sulfide production device provided with a reaction vessel equipped with one or a plurality of supply tubes; at least one of the supply tubes having an insert pipe, which is preferably detachable, to be inserted into an outer supply tube; and a tip opening of the insert pipe being positioned further inward than an inside wall of the reaction vessel. As a result, it is possible to provide a PAS production device provided with supply tubes for loading corrosive materials such as a strong alkali into the reaction vessel, which enables to accurately load prescribed amounts of various raw materials into the reaction vessel without causing a decrease in production efficiency due to the replacement of a supply tube or the repair of the reaction vessel in response to the corrosion of the replacement tube or the like, which yields high industrial applicability.

REFERENCE SIGNS LIST

1 Reaction vessel
11 Cylindrical body
12 Lid
13 Base
131 Discharge tube
21 Mixing impeller
22 Stirring shaft
3 Baffle
4 Supply tube
41 Insert pipe
411 Tip opening (of insert pipe)
412 Flange part (of insert pipe)
42 Outer supply tube
421 Fixing flange part (of outer supply tube)
43 Supply tube main body
431 Fixing flange part (of supply tube main body)
44 Bolt and nut

The invention claimed is:

1. A polyarylene sulfide production device comprising a reaction vessel equipped with one or a plurality of supply tubes; at least one of the supply tubes having an insert pipe to be inserted into an outer supply tube, and a tip opening of the insert pipe being positioned further inward than an inside wall of the reaction vessel, and
wherein the insert pipe has a curved part in a portion thereof.

2. The production device according to claim 1, wherein at least a part of the tip opening is positioned above a liquid surface of a reaction solution inside the reaction vessel, and
an orientation of the tip opening is set so that a flow of a supply liquid supplied from the insert pipe via the tip opening does not face the inside wall of the reaction vessel positioned above the liquid surface.

3. The production device according to claim 1, wherein at least a part of the tip opening is positioned above a liquid surface of a reaction solution inside the reaction vessel, and
a normal line facing the outside of the insert pipe from the inside of the insert pipe at each point on a plane formed by the tip opening does not intersect the inside wall of the reaction vessel positioned above the liquid surface.

4. The production device according to claim 1, wherein when a middle point of a geometric center of gravity of an upper end of the tip opening and a geometric center of gravity of a lower end of the tip opening is defined as middle point A, an intersection of a horizontal plane passing through middle point A and a vertical center axis of the reaction vessel is defined as intersection B, and an orientation from intersection B to middle point A along a straight line connecting intersection B and middle point A is defined as orientation BA, an area of an orthogonal projection formed by a visible portion of the tip end in orientation BA on a plane perpendicular to orientation BA is not less than 1 cm$^2$.

5. The production device according to claim 1, wherein the insert pipe is detachably inserted into the outer supply tube.

6. The production device according to claim 1, wherein the insert pipe is formed from a titanium material or a zirconium material.

7. The production device according to claim 1, wherein a velocity vector of a supply liquid discharged from the insert pipe at the tip opening of the insert pipe is inclined with respect to a horizontal plane.

8. The production device according to claim 1, wherein a tangent at each point on a plane formed by the tip end is inclined with respect a horizontal plane.

9. A method of producing polyarylene sulfide using the production device described in claim 1, said method comprising:
charging a mixture comprising a polar organic solvent, a sulfur source, a dihalo aromatic compound and water in said reaction vessel at 20° C. to 300° C.; and
polymerization in said reaction vessel at 170° C. to 290° C.

* * * * *